United States Patent Office

3,130,167
Patented Apr. 21, 1964

3,130,167
COAGULATING COMPOSITION
Jerome Green, Chicago, Ill., assignor to Nalco Chemical Company, a corporation of Delaware
No Drawing. Filed Feb. 17, 1956, Ser. No. 566,077
2 Claims. (Cl. 252—181)

This invention relates to a method of coagulating and producing setting of finely divided solids, especially those which are predominantly inorganic and normally remain suspended in water, more particularly dilute suspensions in water containing concentrations of predominantly inorganic solids within the range of about 0.001% (10 parts per million) to about 25% by weight of said suspensions.

Among the most difficult industrial problems is the clarification of industrial wastes which would otherwise create a nuisance and cause pollution of lands and streams. Examples of such wastes are phosphate mine waters, coal washing waters, clay suspensions, calcium carbonate suspensions, and other suspensions of finely divided solids in water which result from industrial processes such as mining, washing, purification, and the like. These suspensions normally contain the solid materials in very finely divided form in concentrations within the range of about .001% to about 3% by weight of the suspension and sometimes in amounts up to about 25% by weight of the suspension. Such suspensions will remain stable for days and many of them are not affected by the addition of ordinary coagulants such as alum. If the solids are allowed to remain in suspension the resultant suspension cannot be utilized for industrial processes and also presents a disposal problem.

One of the special problems with which the present invention is concerned is the improvement of floc size and settling in hot phosphate softening processes. In such processes waters containing hardness components, such as calcium and magnesium, are treated with phosphates to form insoluble calcium and magnesium phosphate salts which settle out and are separated by filtration. Orthophosphates, such as anhydrous disodium phosphate, are often employed for this purpose. In this type of process, the precipitated inorganic solids are very finely divided with the result that coagulation and settling are relatively slow and it is difficult to produce a water free from turbidity. Various coagulation aids have heretofore been employed in an effort to improve floc size and settling but many of the materials which function satisfactorily as coagulants in clarifying other types of turbid waters leave much to be desired, and in many cases are ineffective for practical purposes, when employed as coagulation aids in hot phosphate softening processes.

The expression "phosphate softening" as used herein refers to a process in which a water soluble phosphate which forms insoluble calcium and magnesium salts is added to water containing calcium and/or magnesium salts in order to reduce the concentration of calcium and/or magnesium in the water by precipitation as an insoluble phosphate. Hot phosphate softening is frequently used as a primary softening in low hardness waters. It is often used as a secondary softening following lime softening of high hardness waters. The term "lime softening" includes those processes in which lime is employed either alone or in conjunction with minor amounts of soda ash or alkaline materials such as sodium aluminate for the treatment of water to separate the hardness components by precipitation. In the hot softening processes temperatures of 180° F. to 275° F. (under pressure) are frequently employed, the preferred temperatures being within the range of 212° F. to 240° F. Some types of chemicals which are useful in coagulation for other purposes tend to undergo chemical changes and are practically ineffective as coagulation aids in hot phosphate softening processes.

One of the objects of the present invention is to provide a new and improved method for coagulating and producing settling of finely divided, predominantly inorganic solids from relatively dilute suspensions in water.

Another object of the invention is to provide a new and improved process for coagulating and producing settling of finely divided solids which are predominantly inorganic and normally remain suspended in water in concentrations of 0.001% to 25% by weight of the suspension.

A further object of the invention is to provide a process of treating suspensions of the type described in which relatively small amounts of added substances will produce settling of the finely divided solids without introducing into the liquid substances which have a harmful effect on industrial processes or cause harmful pollution of streams.

An additional object of the invention is to provide a process of improving floc size and settling in softening processes, especially in hot phosphate softening. Other objects will appear hereinafter.

In accordance with the invention it has been found that it is possible to produce improved results in the coagulation and settling of finely divided solids which are predominantly inorganic and normally remain suspended in water in concentrations of 0.001% to 25% by weight of the suspension by treating said aqueous suspensions with a small amount, preferably .25 part to 15 parts per million, but sometimes as much as 100 parts per million, based on the weight of the total suspension, of a composition containing both a coagulating clay and a synthetic water dispersible polymer having a weight average molecular weight of at least 10,000 and having a structure derived by the polymerization of at least one monoolefinic compound through the aliphatic unsaturated group, said structure being substantially free of cross linking.

The polymers which have been found to be especially effective for the purpose of the invention are water dispersible synthetic polymers having a linear hydrocarbon structure and containing in a side chain a hydrophilic group from the group consisting of carboxylic acid, carboxylic acid anhydride and carboxylic acid salt groups.

The coagulating clays which have been found to be most effective when employed in conjunction with the aforesaid polymers may be described as colloidal clays which hydrate and swell in water, especially bentonite and saponite. The use of bentonite as a coagulating agent in conjunction with sodium aluminate is shown in U.S. Patent 2,284,827 and the use of saponite as a clarifying agent for turbid waters is shown in U.S. Patent 2,420,340. In accordance with the present invention, however, the combined use of such clays and a water dispersible polymer of the type previously described produces results which are not obtained by the use of the individual components of the coagulating composition. In some cases these compositions containing both the clay and the water dispersible polymer act as aids in forming larger, faster settling precipitates. In other cases they improve the effective removal of the last traces of turbidity. They can also be employed effectively in conjunction with other coagulants such as aluminum sulfate, sodium aluminate, ferric sulfate or ferrous sulfate. For example, they can be added just before or just after, or simultaneously with such other coagulants. The order of addition may vary depending upon the particular type of suspension. It may also vary depending upon whether or not the pH of the suspension is adjusted, for example, by the addition of lime. In general, the order of addition of the compositions employed in the practice of the present invention with respect to other coagulating agents can be determined by routine experiments. Excellent results are obtained in many instances in producing coagulation and settling by employing compositions of the present invention as the sole coagulating agents, that is, without using them in conjunction with any other type of coagulant.

In general, the compositions of the present invention will contain a minor proportion of a water dispersible polymer of the type described as compared with the quantity of coagulating clay. In the preferred compositions of the invention the weight ratio of the water dispersible polymer to the coagulating clay is within the range of 1:20 to 1:1.

Examples of compositions which are suitable for the practice of the invention are as follows.

Ingredients: Parts by weight
Composition A—
  Polyvinylmethylether-maleic anhydride ___ 1
  Bentonite _____ 9
Composition B—
  Polyvinylmethylether-maleic anhydride ___ 1
  Saponite _____ 9
Composition C—
  Sodium polyacrylate _____ 1
  Bentonite _____ 4.5
Composition D—
  Sodium polyacrylate _____ 1
  Saponite _____ 5
Composition E—
  Polyvinylmethylether-maleic anhydride ___ 1
  Soda ash _____ 3
  Bentonite _____ 2
Composition F—
  Polyvinylmethylether-maleic anhydride ___ 1
  Sodium bicarbonate _____ 3
  Bentonite _____ 2

The dosage of the coagulating composition employed in the practice of the invention will vary somewhat depending upon the particular type of suspension treated. As previously indicated however, the dosage will usually be within the range of .25 part to 15 parts of the coagulating composition per million parts of the aqueous suspension of finely divided solids, calculated on a weight basis. In some cases it may be desirable to use as much as 100 parts of the coagulating composition per million parts of suspension.

While especially good results have been obtained by employing as one component of the coagulating composition a synthetic water dispersible polymer of the type described containing a carboxylic acid group, a carboxylic acid anhydride group or a carboxylic acid salt group in a side chain, excellent results are also obtained by employing water dispersible hydrophilic polymers containing in a side chain another hydrophilic group such as, for example, carboxylic acid amide, hydroxy, pyridine, pyrrolidone, hydroxyalkyl and alkoxy. Generally speaking, the water dispersible polymers fall into three classes, namely (1) those consisting of polymeric organic substances which in an aqeuous medium will form organic anions having a substantial number of negative electrical charges distributed at a plurality of positions on the polymer; (2) those consisting of polymeric organic substances which in an aqueous medium will form organic cations having a substantial number of positive charges distributed at a plurality of positions on the polymer; and (3) those consisting of polymer organic substances which in an aqueous medium will not form ions but nevertheless contain a sufficient number of hydrophilic groups to be water dispersible. The first class of materials is referred to herein as anionic organic polymers, the second class is referred to herein as cationic organic polymers, and the third class is referred to herein as non-ionic organic polymers. The first two classes can also be referred to as polyelectrolytes.

The term "polyelectrolyte" is intended to cover synthetic organic polymers which in an aqueous medium will form organic ions having a substantial number of electrical charges distributed at a plurality of positions.

The synthetic organic polymers containing only carboxylic acid, carboxylic acid anhydride, and carboxylic acid salt groups in a side chain or anionic. The synthetic organic polymers containing only pyridine or other similar nitrogen containing nucleus are cationic. The synthetic organic polymers containing only a carboxylic acid amide, pyrrolidone, a hydroxy, a hydroxy alkyl ether and/or an alkoxy group in a side chain are non-ionic. The invention contemplates the employment of polymers which contain anionic, cationic and/or non-ionic groups. It also contemplates the employment of mixtures of anionic, cationic and/or nonionic water dispersible synthetic organic polymers.

An important class of synthetic organic polymers employed for the purpose of the invention consists of the synthetic polymeric water soluble polyelectrolytes having an average molecular weight greater than 10,000 which are copolymers of compounds containing the group

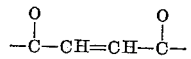

and at least one other monoolefinic monomer.

Another important class of synthetic polymers employed for the purpose of the invention consists of synthetic water soluble polyelectrolytes having a weight average molecular weight of at least 10,000 which are polymers of a compound containing the molecular group

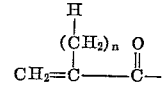

wherein $n$ is an integer from zero to 1, inclusive.

The following water dispersible synthetic organic polymers and their characteristic grouping illustrate the types of polymers which have been found to be effective for the practice of the invention:

| Number | Name | Characteristic Grouping |
|---|---|---|
| 1 | Polyacrylate sodium salt | $-CH_2-CH-$<br>$\quad\quad\quad\mid$<br>$\quad\quad\quad COO^{(-)}$<br>$\quad\quad\quad Na^{(+)}$ |
| 2 | Polymethacrylic acid copolymer sodium salt | $\quad\quad\quad CH_3$<br>$\quad\quad\quad\mid$<br>$-CH_2-C-$<br>$\quad\quad\quad\mid$<br>$\quad\quad\quad COO^{(-)}$<br>$\quad\quad\quad Na^{(+)}$ |
| 3 | Maleic anhydride-vinyl acetate | $-CH-CH_2-CH----CH-$<br>$\;\;\mid\quad\quad\quad\quad\;\;\mid\quad\quad\;\;\mid$<br>$\;\;O\quad\quad\quad\quad\;\;C\quad\quad\;C=O$<br>$CH_3C=O\quad\;O\diagdown\;\;\diagup$<br>$\quad\quad\quad\quad\quad\quad O$ |
| 4 | Polyvinylmethylether-maleic anhydride | $-CH-CH_2-CH----CH-$<br>$\;\;\mid\quad\quad\quad\quad\;\;\mid\quad\quad\;\;\mid$<br>$\;\;OCH_3\quad\quad\;C\quad\quad\;C=O$<br>$\quad\quad\quad\quad\quad O\diagdown\;\;\diagup$<br>$\quad\quad\quad\quad\quad\quad O$ |
| 5 | Methacrylic acid-methacrylamide | $\quad\quad CH_3\quad\quad\;CH_3$<br>$\quad\quad\mid\quad\quad\quad\;\mid$<br>$-CH_2C-CH_2-C-$<br>$\quad\quad\mid\quad\quad\quad\;\mid$<br>$\quad\quad COO^{(-)}\;\;CONH_2$<br>$\quad\quad H^{(+)}$ |
| 6 | Polyacrylic acid | $-CH_2-CH-$<br>$\quad\quad\quad\mid$<br>$\quad\quad\quad COO^{(-)}$<br>$\quad\quad\quad H^{(+)}$ |
| 7 | Isopropenyl acetate-maleic anhydride sodium salt | $\quad\quad CH_3$<br>$\quad\quad\mid$<br>$-CH_2-C----C----CH-$<br>$\quad\quad\mid\quad\quad\;\mid\quad\quad\;\mid$<br>$\quad\quad O\quad\;\;C=O\;\;\;C=O$<br>$\quad\quad\mid\quad\quad\;\mid\quad\quad\;\mid$<br>$\quad CH_3C=O\;\;O^{(-)}\;\;\;O^{(-)}$<br>$\quad\quad\quad\quad\;\;Na^{(+)}\;\;\;Na^{(+)}$ |

| Number | Name | Characteristic Grouping |
|---|---|---|
| 8 | Itaconic acid-vinyl acetate | $\begin{array}{c}COO^{(-)}\\|\\-C-CH_2-CH_2\cdot CH-\\|\quad\quad\quad\quad\quad\quad |\\CH_2COO^{(-)}\quad O\\\\H^{(+)}\quad CH_3C=O\end{array}$ |
| 9 | Polyvinylpyridine-hydrochloride | $-CH_2-CH-$ with pyridinium ring $NH^{(+)}$, $Cl^{(-)}$ |
| 10 | α-methylstyrene-maleic anhydride sodium salt | $\begin{array}{c}CH_3\\|\\-C-CH_2-CH\text{---}CH-\\|\quad\quad\quad\quad |\quad\quad |\\\text{(phenyl)}\quad COO^{(-)}\;COO^{(-)}\\\quad\quad\quad\quad Na^{(+)}\;Na^{(+)}\end{array}$ |
| 11 | Polyvinylpyrrolidone | $\begin{array}{c}-C-CH_2-\\\;\;\diagup\; N\;\diagdown\\H_2C\quad\quad C=O\\|\quad\quad\quad\;\;|\\H_2C\text{---}CH_2\end{array}$ |
| 12 | Styrene-maleic anhydride sodium salt | $-CH-CH_2-CH\;\;\;CH-$ with phenyl, $COO^{(-)}\;COO^{(-)}$, $Na^{(+)}\;Na^{(+)}$ |
| 13 | Polyvinyl alcohol | $\begin{array}{c}-CH-CH_2-\\|\\OH\end{array}$ |
| 14 | Polyvinylmethylether | $\begin{array}{c}-CH-CH_2-\\|\\OCH_3\end{array}$ |
| 15 | Methylmethacrylate-maleic anhydride sodium salt | $\begin{array}{c}CH_3\\|\\-C-CH_2\text{---}CH\text{---}CH-\\|\quad\quad\quad\quad |\quad\quad |\\COOCH_3\;COO^{(-)}\;COO^{(-)}\\\quad\quad\quad\quad Na^{(+)}\;Na^{(+)}\end{array}$ |
| 16 | Polyvinyl acetate emulsion | $\begin{array}{c}-CH-CH_2-\\|\\O\\|\\CH_3C=O\end{array}$ |
| 17 | Acrylic acid styrene copolymer | $-CH-CH_2-CH-CH-$ with phenyl, $COO^{(-)}$, $H^{(+)}$ |

Any of the polyelectrolytes disclosed in U.S. Patent 2,625,529 can be employed for the purpose of the invention. Special mention may be made of the partially hydrolyzed polyacrylamides disclosed in this patent. Where the copolymers are identified in terms of their monomeric constituents it should be understood that the names applied to these copolymers refer to the molecular structure and are not limited to the polymers prepared by the copolymerization of specific monomers. In many cases the identical copolymers can be prepared from other monomers and converted by subsequent chemical reaction to the desired copolymer.

Where the copolymer is derived from a polycarboxylic acid derivative and at least one other monomer copolymerizable therewith the polycarboxylic acid derivative may be maleic anhydride, maleic acid, fumaric acid, itaconic acid, aconitic acid, citraconic acid, the amides of these acids, the alkali metal (e.g., sodium, potassium and lithium), the alkaline earth metal (e.g., magnesium, calcium, barium and strontium), and ammonium salts of these acids, the partial alkyl esters (e.g., methyl, ethyl, propyl, butyl mono esters), the salts of said partial alkyl esters, and the substituted amides of these polycarboxylic acids. Where the hydrophilic maleic acid derivatives are used as one of the starting components to form the copolymer the hydrophobic comonomers may be, for example, styrene, alphamethylstyrene, vinyl toluene, chlorostyrenes, vinyl acetate, vinyl chloride, vinyl formate, vinyl alkyl ethers, alkyl acrylates, alkyl methacrylates, ethylene, propylene, and/or isobutylene.

The water dispersible polymeric substances employed for the purpose of the invention which contain either a positive electrical charge or a negative electrical charge are sometimes referred to as heteropolar substances. The nonionic polymers which contain a sufficient number of hydrophilic groups are water dispersible but do not contain groups having either a positive electrical charge or a negative electrical charge and are sometimes called homopolar substances. It is possible, of course, for the polymer to contain groups, some of which carry a positive electrical charge and others a negative electrical charge. The use of all of such polymers is contemplated in accordance with the invention.

The foregoing synthetic copolymers are preferably obtained by reacting equimolar proportions of a polycarboxylic acid derivative and at least one other monomer but certain of the hydrophilic derivatives of unsaturated polycarboxylic acids can be polymerized in less than equimolar proportions with some of the less hydrophobic comonomers, for example, vinyl formate and vinyl acetate.

Some of the synthetic organic polymers and copolymers are more effective than others, the effectiveness being dependent in part upon the kind and number of said chain groupings in the particular polymer, the molecular weight thereof, and the type of suspension being treated. In general, for effective results the polymer should have a relatively high molecular weight in excess of 10,000 and ordinarily within the range of 15,000 to 100,000.

As will be recognized from the foregoing discussion, generally speaking, the process of the invention involves clarifying a liquid suspension of solids, suspended in an aqueous phase, and comprises the steps of adding to said suspension under flocculating conditions a composition containing a hydrophilic or water soluble polyelectrolyte resin having a structure derived by a method comprising polymerization of at least one monoolefinic compound through the aliphatic unsaturated group and also containing a coagulating clay, the amount of said composition added to said suspension being sufficient to coagulate the suspended solids, and separating the coagulated solids from the aqueous liquid. It should be understood that the expression "separating the coagulated solids from the aqueous liquid" is employed to include and cover separation by settling as well as separation by actually removing the coagulated solids from the water as by filtering and separation by removing water from the coagulated solids, as by decanting or allowing the supernatant water to overflow.

In the preferred practice of the invention the quantity of the polyelectrolyte is within the range of .25 part to 15 parts per million parts of suspension and the quantity of coagulating clay is 2 to 10 times the weight of the polyelectrolyte.

The invention will be illustrated but is not limited by the following examples, in which the quantities are stated in parts by weight unless otherwise indicated.

Example 1

The invention was evaluated on a test medium which consisted of 2000 parts per million of 100 mesh coal powder suspended in Chicago tap water. The tests were run at room temperature (70±5° F.). The effectiveness was determined on the basis of visual observation.

At dosages of 60 p.p.m. and 100 p.p.m. Composition A gave excellent coagulation.

At dosages of 60 p.p.m. and 100 p.p.m. Composition B gave excellent coagulation.

At a dosage of 1.2 parts per million of Composition D (0.2 p.p.m. of the polyacrylate) coagulation was good but the supernatant water was not clean. At dosages of 3.6 p.p.m. and 6 p.p.m. of Composition D good coagulation was obtained in each case with good color removal.

The results obtained with Composition C showed substantial effectiveness of this composition as a coagulant but not quite as good as Composition D.

In each of the foregoing tests the coal suspension was agitated with an agitator operating for ½ minute at 90 revolutions per minute (r.p.m.), 2 minutes at 60 r.p.m. and 5 minutes at 20 r.p.m. for each additive.

Under the same test conditions a composition composed of 1 part of polyvinylmethylether-maleic anhydride and 9 parts by weight of kaolin produced poor results at a dosage of 60 p.p.m. and 100 p.p.m., the supernatant liquid in these cases being very cloudy.

Example II

Composition E was employed effectively in coagulating a phosphate softening water at a dosage of 30 p.p.m., calculated as polyvinylmethylether-maleic anhydride.

Example III

This example illustrates the use of the compositions of the invention as aids to coagulation in accelerating the coagulation process. To demonstrate this, 700 ml. of Chicago tap water was treated with 25 p.p.m. of clay to produce a turbid water which was then coagulated with 50 p.p.m. of alum. After allowing the floc to settle the top 500 ml. was poured off and the remaining water portion containing the floc was poured into a 1 liter Erlenmeyer flask. This resulted in an approximately 175 ml. sample of concentrated sludge. To this example there was then added enough of Composition E to provide 1 p.p.m. of polyvinylmethylether-maleic anhydride. The floc size was greatly increased with very good settling.

Example IV

The test procedure was the same as in Example I except that the suspension treated was an iron ore water obtained from a hydraulic iron mine and having a pH of 9.3. Good coagulation was obtained using a dosage of 1 p.p.m., 5 p.p.m. and 15 p.p.m. of Composition E calculated as the polyvinylmethylether-maleic anhydride. In other words, ⅙ of Composition E is polyvinylmethylether-maleic anhydride; the total dosages of Composition E were respectively 6 p.p.m., 30 p.p.m. and 90 p.p.m.

Example V

A turbid water was synthetically prepared by adding 25 p.p.m. of kaolin and 25 p.p.m. of tannin (Meadtan) to Chicago tap water which was then refrigerated to a temperature of 45° F. and treated with 40 p.p.m. of alum and 6 p.p.m. of sodium aluminate. 12 p.p.m. of Composition E were then added and stirring was begun, starting at 60 r.p.m. for 3 minutes followed by 20 r.p.m. for 5 minutes. The floc size was then observed and it was noted that the size of the floc particles had increased. Good settling was produced.

Example VI

Chicag tap water containing 2000 p.p.m. of a 100 mesh coal suspended therein was successfully coagulated by adding 6 p.p.m., 30 p.p.m. and 90 p.p.m. of Compositions E and F. Good coagulation was obtained with both compositions but better clarification of the supernatant liquid was obtained with Composition F.

The results obtained are subject to some variation depending upon the pH of the suspension treated. In general, the optimum effectiveness is obtained at a pH value between 6 and 8 but the compositions can be employed over a wider pH range from about 3.5 to about 11.5. The optimum effectiveness within this range can be determined by routine experiment.

The invention is especially useful in coagulating and producing settling of finely divided solids which are predominatly inorganic and are present in concentrations of 10 p.p.m. to 30,000 p.p.m. by weight of the total suspension (0.001% to 3%) in water.

The use of the invention makes it possible to cause settling of many different types of solids from aqueous suspension thereof, at a higher rate than has heretofore been possible in many instances. The invention is especially valuable in clarifying turbid waters and in removing from suspensions suspended solids which would otherwise be objectionable and would interfere with the disposal of various types of waste waters and wash waters from industrial processes. The invention is also very valuable in coagulating and producing settling of finely divided solids in phosphate mine waters, coal washing waters, clay suspensions, calcium carbonate suspensions, suspensions obtained in softening processes, especially hot phosphate softening processes, and other suspensions of finely divided solids in water which results from industrial processes, such as mining, washing and purification.

The compositions of the invention are especially useful when employed as an aid to other coagulating agents, particularly in accelerating the rate of settling.

The invention is hereby claimed as follows:

1. A coagulating composition comprising a solid mixture of a water soluble polyelectrolyte resin having a structure derived by a method comprising polymerization of at least one monoolefinic compound through the aliphatic unsaturated group and containing a plurality of hydrophilic, ionizable radicals from the group consisting of carboxy, carboxylic anhydride and carboxylic acid salt radicals and a coagulating clay, the weight ratio of said resin to said clay being within the range of 1:1 to 1:20.

2. A coagulating composition comprising a solid mixture of a water soluble polyelectrolyte resin having a structure derived by a method comprising polymerization of at least one monoolefinic compound through the aliphatic unsaturated group and containing a plurality of hydrophilic, ionizable radicals from the group consisting of carboxy, carboxylic anhydride and carboxylic acid salt radicals and a coagulating clay, the weight ratio of said resin to said clay being within the range of 1:2 to 1:10.

References Cited in the file of this patent

UNITED STATES PATENTS

| | | |
|---|---|---|
| 1,170,868 | Bachler | Feb. 18, 1916 |
| 1,976,679 | Fikentscher et al. | Oct. 9, 1934 |
| 2,043,713 | Saywell | June 9, 1936 |
| 2,236,930 | Uyten bogaart et al. | Apr. 1, 1941 |
| 2,345,827 | Olin | Apr. 4, 1944 |
| 2,625,529 | Hendrick et al. | Jan. 13, 1953 |
| 2,740,522 | Aimone et al. | Apr. 3, 1956 |
| 2,817,645 | Weisgerber | Dec. 24, 1957 |
| 2,817,649 | Contois | Dec. 24, 1957 |

FOREIGN PATENTS

| | | |
|---|---|---|
| 154,799 | Australia | Jan. 19, 1954 |
| 619,040 | France | Mar. 25, 1927 |
| 1,083,610 | France | Jan. 11, 1955 |

OTHER REFERENCES

Lettré et al.: "On Polyvalent Quaternary Ammonium Compounds," 575 Annalen der Chemie 18–28, 1952. Translation in 210–42.52 (14 pages).

Besselievre: "Industrial Waste Treatment," New York; McGraw-Hill, 1952, p. 265. Copy in Library.

Schweitzer: "Rubber Chem. and Technology," vol. 13 (1940), pages 408–418, 210–54. (Copy in Sci. Lib.).

UNITED STATES PATENT OFFICE
CERTIFICATE OF CORRECTION

April 21, 1964

Patent No. 3,130,167

Jerome Green

It is hereby certified that error appears in the above numbered patent requiring correction and that the said Letters Patent should read as corrected below.

Column 1, line 9, for "setting" read -- settling --; column 3, lines 62 and 63, for "polyber" read -- polymer --; column 5, line 55, for "dsclosed" read -- disclosed --.

Signed and sealed this 27th day of October 1964.

(SEAL)
Attest:

ERNEST W. SWIDER
Attesting Officer

EDWARD J. BRENNER
Commissioner of Patents